United States Patent [19]
Bestler et al.

[11] Patent Number: 5,517,502
[45] Date of Patent: May 14, 1996

[54] UPSTREAM TRANSMISSION USING MULTIPLE TRANSMISSION TAGS AND DOWNSTREAM ACKNOWLEDGEMENTS IN CONDITIONAL ACCESS PACKETS

[75] Inventors: Caitlin B. Bestler, Chicago; Harry A. Hartley, Palatine; Khosro M. Rabii, Arlington Heights, all of Ill.

[73] Assignee: Zenith Electronics Corp., Glenview, Ill.

[21] Appl. No.: 398,208

[22] Filed: Mar. 2, 1995

[51] Int. Cl.⁶ .............................. H04N 7/16; H04N 1/16
[52] U.S. Cl. ........................ 370/94.2; 348/10; 348/12; 348/13; 455/4.2
[58] Field of Search .................. 370/60, 60.1, 94.1, 370/94.2, 71, 73, 124, 85.1, 85.2, 85.3, 85.4, 85.5, 95.1, 95.3, 110.1; 348/6, 7, 12, 13, 10; 455/3.1, 4.1, 4.2, 5.1, 6.1, 6.2, 6.3; 371/32, 33

[56] References Cited

U.S. PATENT DOCUMENTS

| | | | |
|---|---|---|---|
| 4,533,948 | 8/1985 | McNamara et al. | 348/7 |
| 4,554,579 | 11/1985 | Citta | 348/7 |
| 4,633,462 | 12/1986 | Stifle et al. | 370/85.1 |
| 5,371,532 | 12/1994 | Gelman et al. | 455/4.2 |

*Primary Examiner*—Wellington Chin

[57] ABSTRACT

Upstream transmissions in a two-way communications network are effected from subscriber terminals in upstream packets having one of a plurality of different separately acknowledgeable acknowledgment tags. Downstream acknowledgments of upstream messages are contained in CA packets multiplexed with product packets to form a transport bitstream. The transport bitstream is applied to a digital conditional access module (DCAM) in the terminal which is controlled by the conditional access data bits of the CA packets. The DCAM includes a status register for storing the acknowledgment bits of the CA packets, which bits are coupled by a microprocessor for controlling the upstream transmitter.

17 Claims, 6 Drawing Sheets

| ⊢3 Bytes⊣ | 2 Bytes | | | ⊢2 Bytes⊣ |
|---|---|---|---|---|
| Message Synch | Message Type | ACK Tag | Message Payload | CRC |

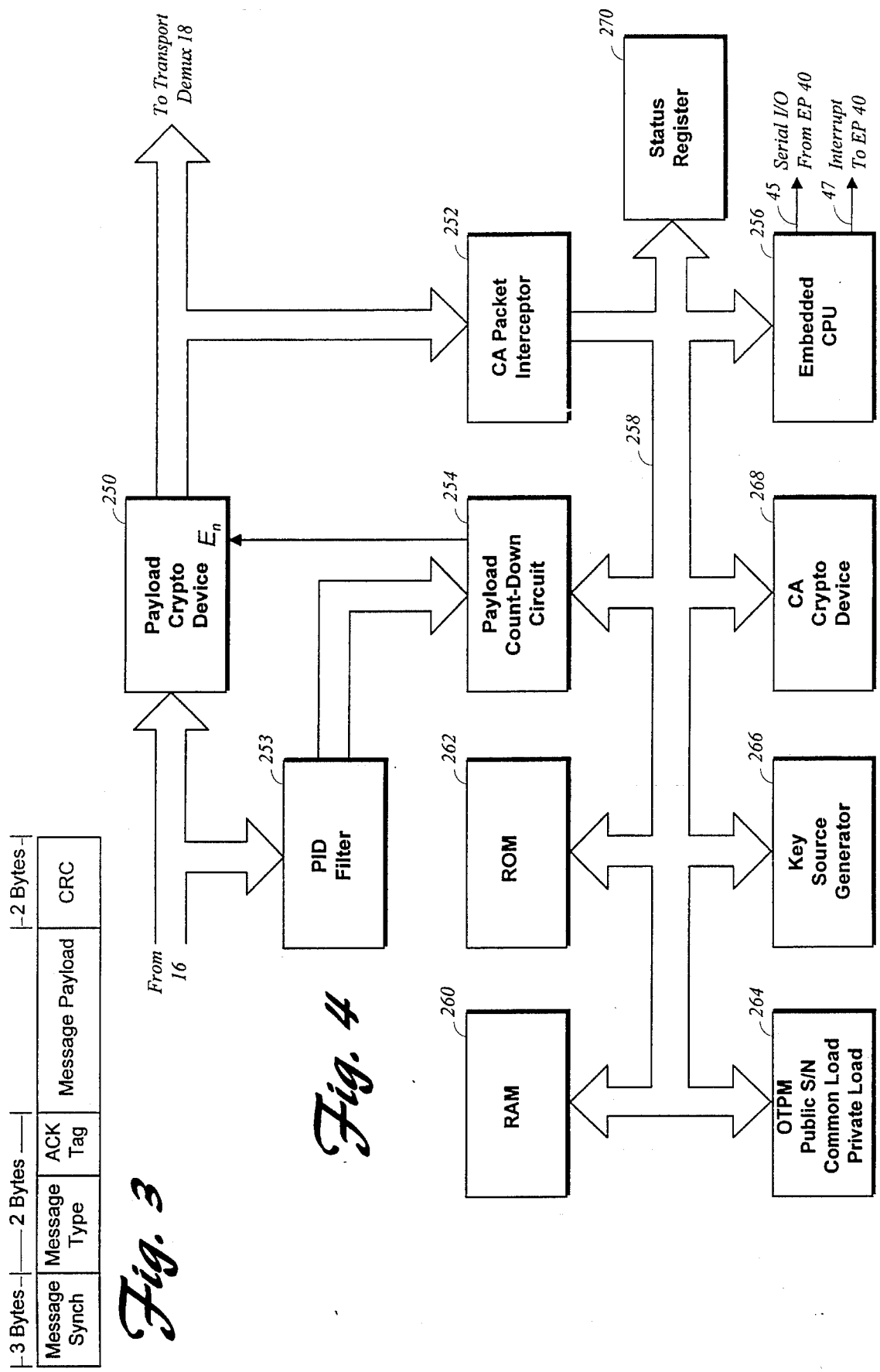

Fig. 5A

CA INITIALIZATION PACKET

| PID = 1 | Type | Public S/N | Active & Received CA Key Sources | Active & Received Payload Key Sources | Comm Bits — Authorization |
|---|---|---|---|---|---|

Encryption: None — Common Key — 1. Private Key / 2. Common Key — Active CA Key Source

Fig. 5B

CA CONFIGURATION LOAD PACKET

| PID = 1 | Type | Public S/N | Received Payload Key Source | Received CA Key Source | Authorization Bit Map |
|---|---|---|---|---|---|

Encryption: None — Active Payload Key Source — Active CA Key Source

Fig. 5C

CA PID AUTH PACKET

| PID = 1 | Type | Public S/N = 1 | PID | Authorization Level | Countdown Reg Level |
|---|---|---|---|---|---|

Encryption: None — Active Payload Key Source — Active CA Key Source

Fig. 6

| PID Reg₀ | PID Reg₁ | PID Reg₂ | PID Reg₃ | ..... | PID Reg₉ |
|---|---|---|---|---|---|
| CD Reg₀ | CD Reg₁ | CD Reg₂ | CD Reg₃ | ..... | CD Reg₉ |

272a, 272b, 272c, 272d, 272j
274a, 274b, 274c, 274d, 274j

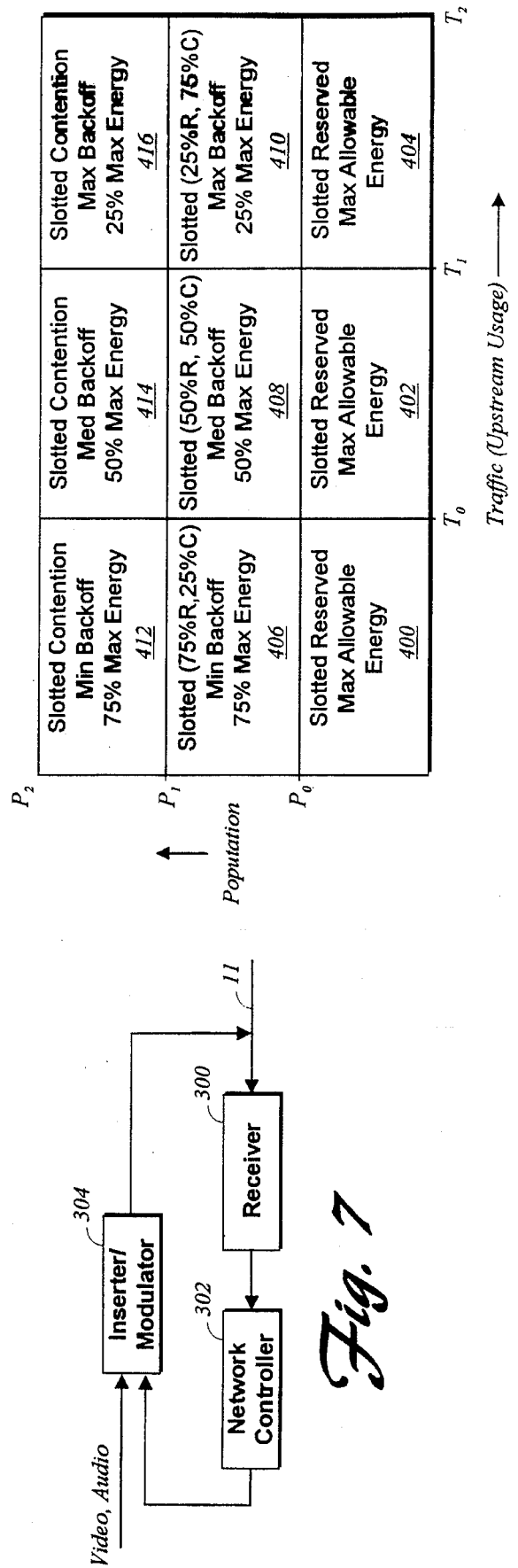

UPSTREAM TRANSMISSION USING MULTIPLE TRANSMISSION TAGS AND DOWNSTREAM ACKNOWLEDGEMENTS IN CONDITIONAL ACCESS PACKETS

BACKGROUND OF THE INVENTION

The present invention relates generally to two-way communication networks of the type used in cable television systems and particularly concerns techniques for providing downstream acknowledgments of subscriber upstream messages.

Cable television systems utilize a central provider of program information which services a large number of end users generally referred to as subscribers. The central provider portion of the cable television system, usually called the "headend", provides a plurality of program information as well as other information to the subscribers via a multiple branch distribution network which may define several tiers of distribution facilities.

In addition to actual programming information, the cable television system is required to carry additional management and operating data, such as conditional access data, provided by the headend to the large number of end users or subscribers. Communication from the headend to the subscribers is generally referred to as "downstream" communication. In some cable television systems referred to as one-way, all information and data is transferred downstream. In other cable television systems referred to as two-way systems, communication is also provided from the various subscribers throughout the network to the headend in what is referred to as "upstream" communication.

Upstream communication in a cable television system is normally provided using an out-of-band carrier, usually between five and thirty megahertz, which is modulated with upstream data at the subscriber decoder and transmitted to the headend. Examples of subscriber originated upstream messages may include program purchasing requests, opinion poll responses, and subscriber terminal status information. Some of these messages, e.g. program requests, may require downstream acknowledgment and authorization while others, e.g. terminal status information, may be initiated in response to an appropriate downstream command.

Upstream communications are typically effected using either a contention protocol as disclosed in U.S. Pat. Nos. 4,528,663 and 4,553,161 wherein the subscriber's contend for access to the upstream channel or by providing each subscriber with guaranteed access to a respective relatively small portion of the upstream spectrum. Depending on the type and quantity of usage, one protocol may be more advantageous than the other, or a mixture of both may provide the most effective performance. In either case, upstream messages are transmitted in respective time slots which may be assigned to individual subscribers on a reserved basis to guarantee access to the upstream channel or which multiple subscribers may use on a contention basis. Acknowledgment by the central facility of successfully received upstream subscriber messages is normally effected using dedicated downstream acknowledgment messages. Such acknowledgment messages may, for example, be multiplexed as auxiliary data packets in a downstream transport bitstream and separated therefrom in the subscriber's terminal on the basis of their unique header identification code. This approach is wasteful of downstream overhead and is therefore not considered desirable. This approach suffers the further disadvantage that the downstream acknowledgment messages are substantially displaced in time from the downstream messages providing subscriber authorization of a requested program or service since the two are transmitted in separate downstream packets.

It is therefore a basic object of the present invention to provide an improved two-way data transmission system for a subscription service such as a two-way cable television network.

It is a more specific object of the invention to provide a two-way data transmission system which provides downstream acknowledgment of upstream subscriber messages using a minimum amount of overhead.

It is a further object of the invention to provide a two-way data transmission system in which disjunctive downstream responses to upstream messages are minimized.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 3 illustrates the format of an upstream transmission packet in accordance with the invention;

FIG. 4 sets forth a block diagram of the DCAM shown in FIG. 1;

FIGS. 5A–5C illustrate the format of different CA packets according to the invention;

FIG. 6 illustrates the PID and countdown registers of the DCAM of FIG. 4;

FIG. 7 sets forth a block diagram of the cable system headend of the upstream data transmission system of the invention;

FIG. 8 is a table illustrating a model used by the network controller of FIG. 7 for controlling the operation of the upstream data transmission system of the invention.

DESCRIPTION OF THE PREFERRED EMBODIMENT

Figure 1:
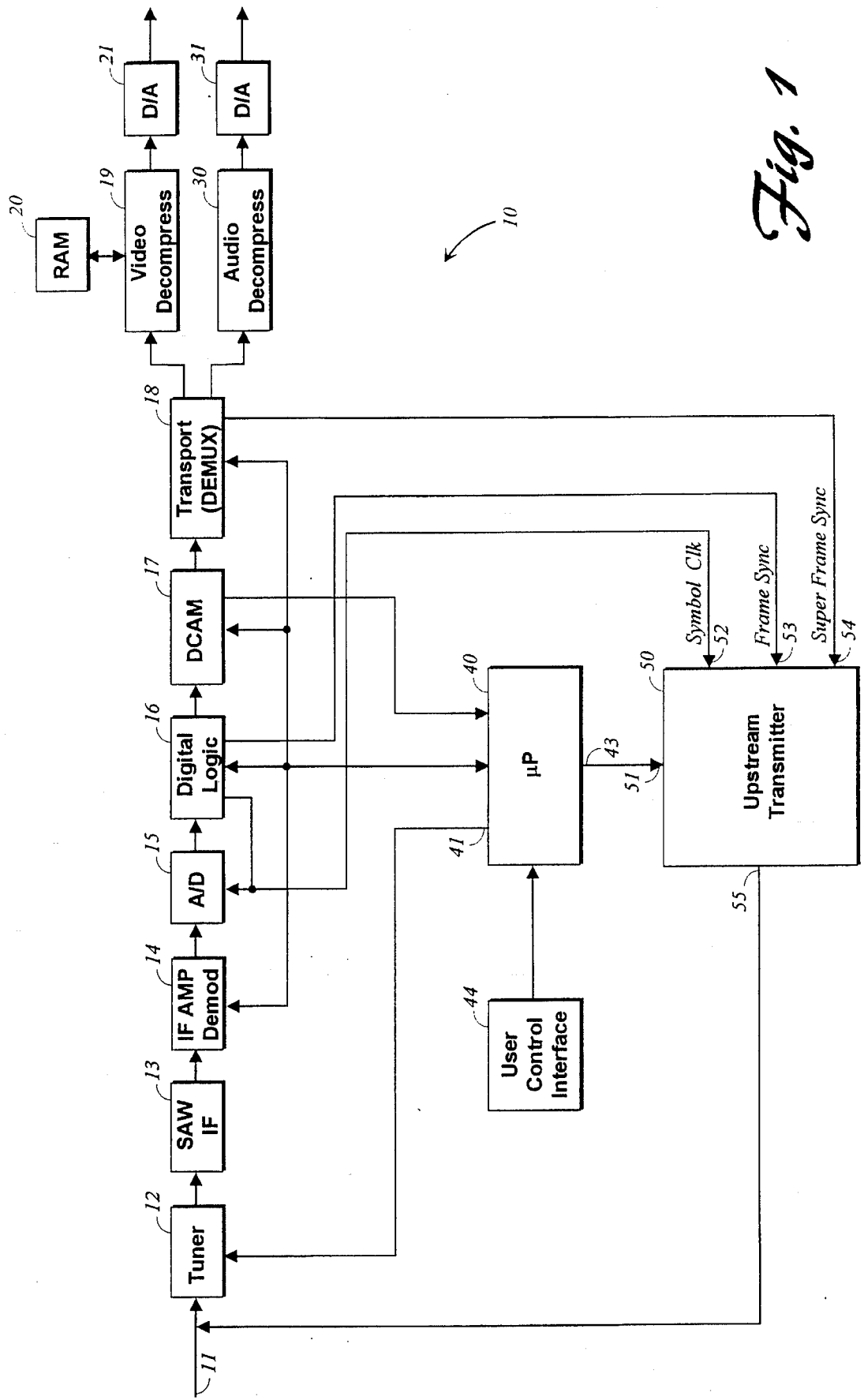
FIG. 1 sets forth a general block diagram of a cable television subscriber decoder constructed in accordance with the present invention.

FIG. 1 sets forth a block diagram of a cable television subscriber terminal constructed in accordance with the present invention and generally referenced by numeral 10. Subscriber terminal 10 includes a tuner 12 for receiving transmitted downstream signals from a cable television distribution system 11 or other suitable transmission medium. The output of tuner 12 is coupled to an intermediate frequency filter 13, typically a SAW filter, and therefrom to the input of an intermediate frequency amplifier and demodulator circuit 14. The output of demodulator 14 is coupled to an analog to digital converter 15, the output of which is applied to the input of a digital data recovery and error correction circuit 16.

The output of digital circuit 16 comprises an MPEG transport bitstream including a series of MPEG product and conditional access (CA) packets. Each such packet includes an unencrypted 4-byte header comprising a 13-bit packet identifier (PID) identifying the contents of the packet followed by 184-bytes of encrypted payload. A product packet may comprise a compressed video packet, a compressed audio packet or a packet containing auxiliary data. Each such packet is identified by its own unique PID, with a PID having a value of one (00..01) be reserved for CA packets. Depending on the degree of compression employed and on the maximum bit-rate provided by the transmission system, the transport bitstream derived from a tuned 6 MHz television channel may represent one or more television programs, the components (e.g. video and audio) of each television program being identified by their own respective PID's.

The MPEG transport bitstream developed at the output of circuit 16 is coupled to a digital condition access module (DCAM) 17 which is responsive to CA packets multiplexed in the transport bitstream for selectively authorizing and deauthorizing subscriber terminal 10 for various television programs and other services. DCAM 17 is also operative for decrypting the payloads of product packets having PID's corresponding to a program selected for viewing by the subscriber and for which the subscriber has appropriate authorization. The output of DCAM 17 is coupled to an MPEG transport demultiplexer 18 which couples the decrypted video packets to a video decompression circuit 19 and the decrypted audio packets to an audio decompression circuit 30. Video decompression circuit 19 may include a random access memory 20 coupled thereto. The decompressed video signal developed at the output of video decompression circuit 19 is applied to a D/A converter 21 which is coupled to a suitable video display. Correspondingly, the decompressed audio signal developed at the output of audio decompression circuit 30 is applied to a D/A converter 31 which is coupled to a suitable audio system.

Subscriber terminal 10 further includes a microprocessor 40 having a channel selection output 41 for controlling tuner 12, an input for receiving an interrupt signal from DCAM 17 and a bidirectional data coupling to demodulator 14, digital circuit 16, DCAM 17 and demultiplexor 18. Microprocessor 40 is responsive to signals from a user control interface 44 operable by a subscriber for selecting a program for viewing. Subscriber terminal 10 further includes an upstream transmitter 50, the structure of which is set forth below in FIG. 2 in greater detail. Upstream transmitter 50 includes an input 51 coupled to output 43 of microprocessor 40 and has an output 55 coupled to cable 11 for providing upstream transmissions over the cable distribution system. Upstream transmitter 50 further includes a symbol clock input 52 coupled to digital circuit 16, a frame sync signal input 53 also coupled to digital circuit 16, and a superframe synchronization signal input 54 coupled to demultiplexor 18.

In operation, a plurality of broadcast signals are coupled by cable 11 to the input of tuner 12 which in response to a channel selection signal supplied by microprocessor 40 couples a selected signal to intermediate frequency filter 13. The output of filter 13 is demodulated by intermediate frequency amplifier and demodulator circuit 14. Demodulator 14 may be constructed in accordance with conventional fabrication techniques and may, for example, include a synchronous demodulator. The essential function of demodulator 14 is to recover the baseband analog signal modulated upon the carrier selected by tuner 12. While different transmitting signal formats and methods may be utilized in communicating data through a cable television system, the example shown in FIG. 1 utilizes a digital vestigial sideband system in which N-level symbols having a symbol rate of approximately 10.76 megahertz are transmitted and received together with a data frame sync signal having a frequency of approximately 41.2 kilohertz resulting in data frames of approximately 24.3 milliseconds in duration. The demodulated baseband analog signal at the output of demodulator 14 comprises successive N-level symbols equally spaced by the period of the symbol clock signal. The analog to digital conversion performed by converter 15 is clocked at the symbol clock frequency to accurately recover the amplitudes of each symbol in the form of a multibit value. The output of converter 15 is processed by digital circuit 16 to recover the frame sync signal in synchronism with the received frame and to generate the symbol clock signal for operating converter 15. The output data signal of digital circuit 16 comprises the recovered digital MPEG transport bitstream comprising CA packets and product packets representing one or more television programs. This transport bitstream is further selectively processed by DCAM 17 and thereafter demultiplexed in demultiplex circuit 18 to provide input video and audio signals to decompression circuits 19 and 30 respectively. Circuits 19 and 30 perform conventional video and audio decompression operations upon the applied video and audio data to produce decompressed video and audio signals which are converted to corresponding analog signals within digital to analog converters 21 and 31. The analog signals thus provided are applied to the video display and audio system (not shown) respectively.

The structure of upstream transmitter 44 is set forth below in FIG. 2 in greater detail. Upstream transmitter 50 is coupled to cable 11 for upstream transmission and operates in response to a symbol clock input at input 52 from digital circuit 16 together with a frame sync signal input at input 53 also received from digital circuit 16. Upstream transmitter 50 further responds to a superframe sync signal at input 54 which is provided by transport and demultiplexor 18 and to a programmable width signal which is coupled from output 43 of microprocessor 40 to input 51 of upstream transmitter 50. Upstream transmitter 50 utilizes the width signal, the superframe sync signal, the symbol clock and the frame sync signal to properly time upstream communication applied to cable 11 from subscriber terminal 10 by generating a plurality of message transmission time slots each of which may be uniquely assigned to a respective subscriber or which may be used as a contention time slot. The width and timing location of the time slots for subscriber terminal 10, as well as all other subscriber terminals on the cable television system, is programmably controllable by headend manipulation of the width and superframe sync signals applied to the subscriber terminals. Thus, the time slots for each subscriber terminal are programmably controlled from the headend to accommodate dynamic changes within the cable television system, including establishing the time slots as contention or reserved and controlling the width and number of the slots.

As will be described in greater detail hereinafter, both the upstream carrier signal and the generated time slots are synchronized with the symbol clock. This allows the use of a plurality of upstream carrier signals at different frequencies which are all locked to the symbol clock which makes the most efficient use of the available upstream bandwidth. Thus, with each carrier signal locked to a common reference, different subscriber terminals may readily transmit at different upstream carrier frequencies.

In addition, because the symbol clock is used in creating the subscriber time slots, the proper relative timing between time slots at each subscriber terminal is assured. That is to say, all time slots are synchronized to the common reference of the symbol clock.

Figure 2:
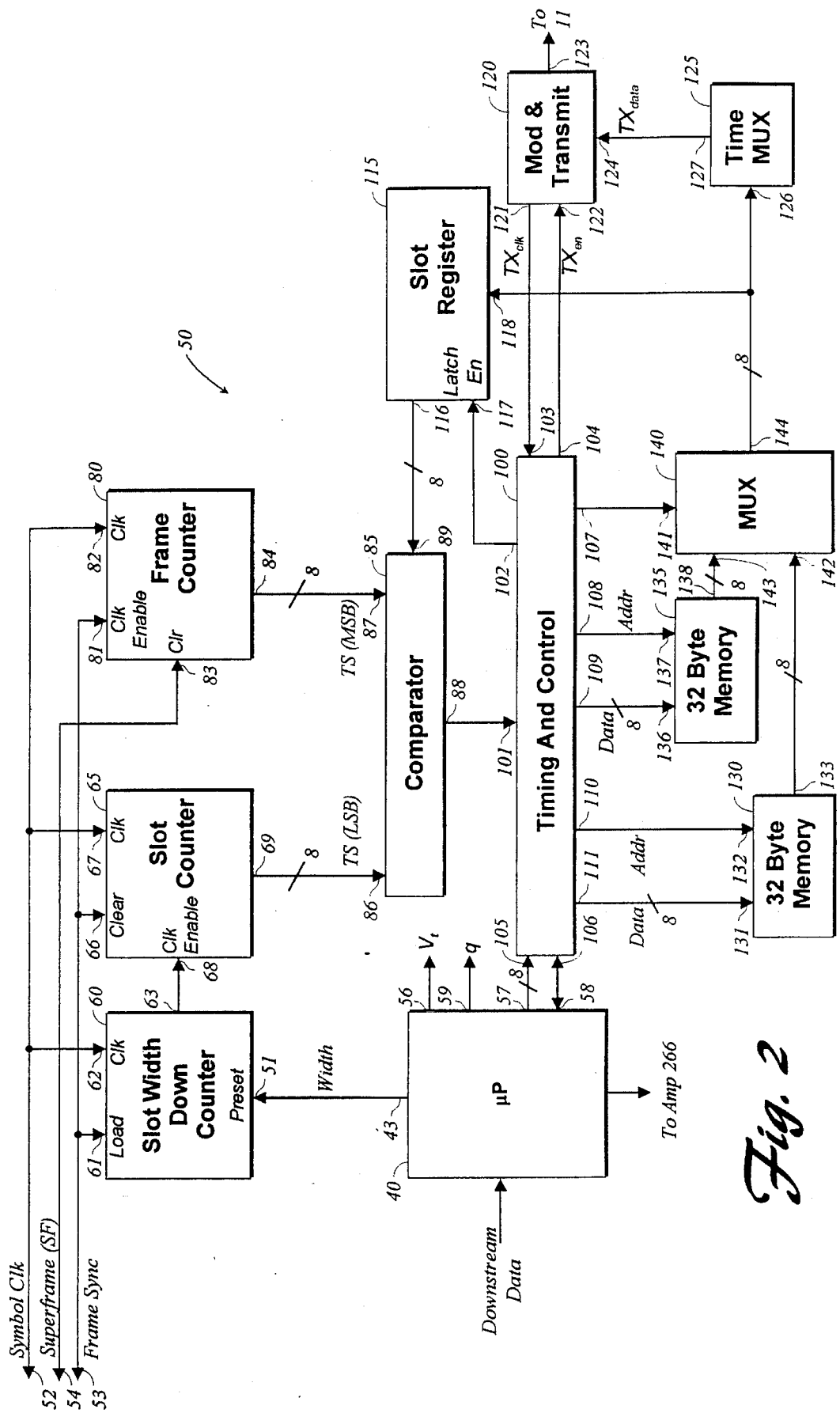
FIG. 2 sets forth a block diagram of the upstream transmitter of the present invention upstream data transmission system.

Referring to FIG. 2 in more detail, upstream transmitter 50 includes a slot width down counter 60 having a load input 61, a clock input 62, an output 63 and a preset input 51. A slot counter 65 includes a clear input 66, a clock input 67, a clock enable input 68 and an output 69. A frame counter 80 includes a clock enable input 81, a clock input 82, a clear input 83 and an output 84. Symbol clock input 52 (corresponding to the downstream symbol rate) is coupled to clock input 62 of counter 60, clock enable input 67 of counter 65 and clock input 82 of counter 80. Superframe sync input 54 is coupled to clear input 83 of counter 80. Frame sync input 53 (corresponding to the downstream data frame sync signal) is coupled to load input 61 of counter 60, clear input 66 of counter 65 and clock enable input 81 of frame counter 80. Output 63 of counter 60 is coupled to clock enable input 68 of slot counter 65.

Microprocessor 40 includes output 43 coupled to preset input 51 of counter 60. Microprocessor 40 further includes a tuning voltage output 56, a q signal output 59, a data output 57 and a status signal coupling 58. A comparator 85 includes an input 86 coupled to output 69 of counter 65, an input 87 coupled to output 84 of frame counter 80, an input 89, and an output 88. A timing and control circuit 100 includes an input 101 coupled to output 88 of comparator 85, an output 102, and a transmission clock signal input 103. Timing and control circuit 100 further includes a data input 105 coupled to data output 57 of microprocessor 40 and an input 106 coupled to status line input 58 of microprocessor 40. Timing and control circuit 100 also includes a data output 111 and an address output 110 coupled to inputs 131 and 132 of a memory 130. Timing and control circuit 100 further includes a data output 109 and an address output 108 coupled to inputs 136 and 137 respectively of a second memory 135. A multiplex circuit 140 includes an input 141 coupled to output 107 of circuit 100, inputs 142 and 143 coupled to outputs 133 and 138 of memories 130 and 135 respectively, and an output 144. A slot register 115 includes an output 116 coupled to input 89 of comparator 85, an enable input 117 coupled to output 102 of circuit 100, and an input 118 coupled to output 144 of multiplex 140. A time multiplex circuit 125 includes an input 126 and an output 127. A transmission modulator 120 includes a transmission clock output 121 coupled to input 103 of circuit 100 and a transmission enable input 122 coupled to output 104 of timing and control circuit 100. Transmission modulator 120 further includes a transmission data input 124 coupled to output 127 of multiplex circuit 125 and an output 123 coupled to cable 11 (seen in FIG. 1).

In operation, processor 40 provides a programmable slot width number to preset input 51 of down counter 60. Down counter 60 responds to the next frame sync signal applied to load input 61 to set down counter 60 to the programmable slot width number. Thereafter, down counter 60 responds to symbol clock signals at input 62 to count downwardly from the slot width number and produces an output signal at output 63 each time a zero count is obtained. Thereafter, slot width down counter 60 recycles producing a plurality of successive output signals at output 63 each of which corresponds to the time interval in which counter 60 counts downwardly from the programmable slot width number. The succession of outputs from slot width counter 60 is applied to clock enable input 68 of counter 65 which is cleared each time a frame sync signal is applied to clear input 66. Counter 65 responds to the applied clock signals to produce an output count at output 69 synchronously with the symbol clock which corresponds to the sequentially established time slots created by slot width counter 60. Thus, the output of slot counter 65 at output 69 provides a time slot identifying number which is applied to input 86 of comparator 85. Frame counter 80 receives frame sync signals at clock enable input 81 to produce an output count at output 84 synchronously with the symbol clock which corresponds to the number of frame sync intervals which have occurred following the most recent superframe sync signal. The output count of frame counter 80 is coupled to input 87 of comparator 85.

Thus, the output of counter 65 comprises a succession of eight-bit slot identifying numbers occurring within each data frame sync interval. Correspondingly, the output of frame counter 80 comprises an eight-bit running count identifying each successive frame which has occurred following the previous superframe sync signal. As a result, the combination of eight-bit output counts of counters 65 and 80 when combined form a 16-bit number which identifies a plurality of periodically recurring time slots coextensive with one or more data frames of the received vestigial sideband signal. Each time slot therefore is uniquely identified by the combined number formed by the outputs of counters 65 and 80 in which the output of counter 65 forms the eight least significant bits of the number while the output of counter 80 forms the eight most significant bits of the time slot identifying number. This combined number is utilized by comparator 85 to provide sequential identification of each time slot within each superframe as the vestigial sideband signal is received.

Each subscriber terminal within the network may be assigned a unique time slot or a contention time slot for upstream data transmission. Such assignments are made by downloading one or more time slot numbers to microprocessor 40 via transport demultiplexer 18, which time slot numbers can be used by the subscriber terminal for upstream transmissions as described in further detail hereinafter. A uniquely assigned time slot (sometimes referred to as a reserved time slot) can, of course, only be used by the respective subscriber terminal and thereby guarantees access to the network. On the other hand, all subscriber terminals may attempt upstream transmissions during contention time slots, a successful transmission resulting in the receipt of an "Acknowledge" signal (ACK) by the terminal. In the case of an unsuccessful transmission, the message is normally retransmitted in a subsequent contention slot defined by a so-called "back-off" algorithm which may also be downloaded in microprocessor 40 by the network.

Upstream transmitter 50 initiates upstream data transmission by initially transferring a sixteen-bit time slot identifying number (which may represent either a reserved or contention time slot) to memory 130 through timing and control circuit 100. In transferring the sixteen-bit time slot identifying number to memory 130, the eight least significant bits and eight most significant bits are preferably loaded into different memory location to be accessed separately. The remaining memory locations within memory 130 are filled with a data packet (described in further detail hereinafter) to be transmitted upstream (which is also transferred to the memory through timing and control circuit 100). Thereafter, the eight most significant bits which correspond to the frame identifying portion of the time slot identifying number are coupled from memory 130 by multiplexor 140 to slot register 115. Comparator 85 generates an internal match signal when the eight most significant bits of the time slot identifying number at input 89 match the eight most significant bits from counter 80. In response thereto, the eight least significant bits comprising the time slot identifying number from memory 130 are coupled through multiplexor 140 to slot register 115. Thereafter, slot register 115 applies the eight least significant bits to input 89 of comparator 85. Comparator 85 performs a comparison of the eight least significant bits of the time slot identifying number at input 89 to the current eight least significant bits at input 86 and produces an output signal at output 88 when a match occurs. In response to the match signal, timing and control circuit 100 then causes the stored data packet within memory 130 to be outputted to multiplexor 140 and thereafter to time multiplexor 125. Multiplexor 125 converts the data packet to a serial data stream which is applied to modulator 120 forming the transmission data. Concurrently, timing and control circuit 100 enables transmission modulator 120 causing the serial bit stream transmission of the data packet upon cable 11 (seen in FIG. 1) during the respective time slot.

To further enhance the effectiveness of upstream transmitter 50, a second memory 135 identical to memory 130 and coupled to data and address outputs 109 and 108 respectively is also coupled to multiplex circuit 140. The purpose of providing memory 135 is to utilize an alternating memory access for timing and control circuit 100 in which one memory may be loaded with data while the other is outputting data to transmit upstream. This improves the effectiveness and throughput capability of the present invention system.

The configuration of an exemplary data packet is illustrated in FIG. 3. As shown in the Figure, the upstream data packet comprises a 3-byte Message Synch code followed by a 2-byte Message Type code. The remainder of the packet comprises the upstream message payload and a 2-byte CRC. The message payload typically comprises a subscriber identification number and the identification of a particular requested service, such as a particular impulse-pay-per-view (IPPV) television program. The Message Type code identifies the type of message provided in the message payload and further comprises an Acknowledgment (ACK) tag which, in the preferred embodiment of the invention, can take either one of two values referred to as odd ACK and even ACK. In a more general sense, the ACK tag can take any number N of different values with due consideration taken of the overall packet size and upstream network traffic. The purpose of the ACK tags is to allow for the transmission of multiple data packets each of which is separately acknowledgeable by the central facility. Thus, for example, in a system using N=16 ACK tags, 16 data packets may be transmitted in succession each with its own unique ACK tag and each being separately acknowledged by the central facility. As soon as an acknowledgment is received over the downstream path, the associated ACK tag may be reused by microprocessor 40 to transmit another packet. The use of ACK tags as described above increases the upstream message rate of a given subscriber terminal 10. If upstream message traffic becomes excessive, the central facility may initiate a downstream message to microprocessor 40 (delivered via demultiplexer 18) to reduce the number of ACK tags being used (e.g. from 16 to 8 to 4, etc.) to accommodate the increase in upstream traffic.

As mentioned previously, in a preferred embodiment of the invention 2 ACK tags referred to as odd and even are used. The ACK tag in the Message Type code (see FIG. 3) would therefore identify the packet as requiring either odd acknowledgment (odd ACK tag) or even acknowledgment (even ACK tag). Two packets may therefore be transmitted one after the other, one with an even ACK tag and the other with an odd ACK tag. Receipt by terminal 10 of an even acknowledgment from the central facility indicates successful reception of the upstream packet with the even ACK tag and receipt of an odd acknowledgment indicates successful reception of the upstream packet with the odd ACK tag. Odd and even acknowledgments (or more if an ACK tag having a value greater than 2 is used) are received by terminal 10 according to an important aspect of the invention in a CA packet addressed to the terminal, and in particular to DCAM 17 of the terminal.

The structure of DCAM 17 is shown in greater detail in FIG. 4. DCAM 17 preferably comprises an ASIC which implements the conditional access and decryption functions of subscriber terminal 10. As shown in FIG. 4, the transport bitstream from digital circuit 16 is supplied to a payload crypto device 250, whose output is coupled to transport demultiplexer 18 and also supplies a CA packet interceptor 252. The transport bitstream is also supplied through a PID filter 253 to a payload countdown circuit 254 which includes an output coupled to the Enable input of payload crypto device 250. The output of CA packet interceptor 252 is supplied to an embedded CPU 256 over a bus 258. Bus 258 also couples CPU 256 to payload countdown circuit 254, a RAM 260, a ROM 262, a one-time-programmable memory (OTPM) 264, a key source generator 266, a CA crypto device 268 and a status register 270. Communications between CPU 256 and processor 40 (see FIG. 1) are effected over lines 45 and 47.

The operation of DCAM 17 is controlled by CA packets (PID=1) coupled by CA packet interceptor 252 to CPU 256. There are a number of different types of CA packets (identified by the first 3-bits of the packet payload) including CA initialization packets, CA configuration load packets and CA PID authorization packets. The CA initialization packets (see FIG. 5A) are used to initialize various keys used in DCAM 17, to initialize the subscriber authorization levels of a bit map (e.g. 256 bits) and an authorization list stored in RAM 260 and to supply a series of communication status bits used to control the operation of upstream transmitter 50 as will be described in further detail hereinafter. In particular, each subscriber DCAM 17 includes a unique 4-byte public serial number (S/N), a common load and a private (master) load all stored in OTPM 264. The common and private (master) loads are combined with selected bytes of ROM 262, which includes a stored program for controlling the operation of CPU 256, for providing respective common and private (master) keys. Each subscriber DCAM further includes active CA and payload key sources and received CA and payload key sources provided by key source generator 266. Each CA initialization packet includes the public S/N of one or more subscriber terminals together with the associated active and received CA and payload key sources, communication bits and authorization levels. The received public S/N, which is encrypted with the network common key, is decrypted by payload crypto device 250 in response to the common key derived from OTPM 264. The decrypted public S/N is supplied to CPU 256 which determines whether it matches the public S/N stored in OTPM 264. If a match exists, CPU 256 fetches the received active and received CA key sources for storage in key source generator 266. These key sources are encrypted first with the private key corresponding to the packet public S/N and then with the network common key. They are therefore decrypted first by payload crypto device 250 using the common key from OTPM 264 and then by the CA crypto device 268 using the private key from OTPM 264. The active CA key source now provided by key source generator 266 is used to build a decryption table used by CA crypto device 268 to decrypt further CA encrypted data bytes. Such further data bytes include the active and received payload key sources which after decryption are stored in key source generator 266, the communication status bits which after decryption are stored in status register 270, and authorization levels which after decryption are stored in the bit map and authorization list of RAM 260.

The CA configuration load packet is illustrated in FIG. 5B. It is similar in format to the CA initialization packet and is used to provide new CA and payload key sources for key source generator 266. The packet is also used to refresh the authorization bit map stored in RAM 260. As shown in FIG. 5B, the packet type and public S/N are encrypted using the active payload key source previously downloaded in a CA initialization packet and are therefore decrypted by payload crypto device 250 in response to the corresponding decryption table. If CPU 256 establishes that the decrypted public S/N matches the public S/N stored in OTPM 264, the received payload and CA key sources are decrypted by CA crypto device 268. These key sources will become the active key sources if they differ from the current active key sources and result in rebuilt decryption tables for payload and CA crypto devices 250 and 268.

Processing of the CA initialization and configuration load packets therefore results in DCAM 20 having been individually addressed to download various decrypted critical operating parameters (i.e. decryption keys and authorization levels). In particular, the CA key source is downloaded after it is decrypted using the private key of DCAM 17, the downloaded CA key source being used in turn to provide for downloading of the payload key source. Moreover, a would-be pirate can neither artificially create nor selectively filter subsequent CA packets since the packet payload, including CA packet type, of each such CA packet is encrypted using the payload and CA key sources. As will be explained in further detail, the inability to either create illegitimate CA packets or selectively filter de-authorizing packets prevents a would-be pirate from compromising system security.

The format of a CA PID authorization packet is illustrated in FIG. 5C. This packet, which is globally addressed using a public S/N=1, is the most frequently transmitted CA packet. The packet comprises a type code and a public S/N=1, both encrypted using the active payload key source and both decrypted by payload crypto device 250. The packet further comprises one or more PID's, each with an associated authorization level and countdown register level, all encrypted using the active CA key source and therefore decrypted by CA crypto device 268. As will be explained in further detail hereinafter, each active PID within a given 6 MHz channel must be transmitted and received by DCAM 17 in a CA PID authorization packet at a predetermined minimum rate in order to maintain payload crypto device 250 operable for decrypting payloads of product packets with corresponding PID's. Therefore, if the CA bitstream to DCAM 17 is interrupted, payload crypto device 250 will become inhibited and thereby cease decrypting product packets.

More specifically, assume a subscriber elects to view a particular television program contained within a tuned 6 MHz television channel. The selected program has an authorization level "A" and is comprised of packets having PID's 317, 318, and 319. PID 317 may, for example, identify compressed video packets, PID 318 compressed audio packets and PID 319 auxiliary data packets. Upon selecting the program (using user control interface 46), external processor 40 causes CPU 256 to determine whether the subscriber is authorized to view the program. That is, CPU 256 checks RAM 260 to determine if authorization level "A" is found in the stored authorization bit map or authorization list. Assuming authorization level "A" is found in RAM 260, the three PID's 317, 318 and 319 of the selected program are transferred over bus 258 for storage in respective PID registers 272a, 272b and 272c (see FIG. 6) of payload countdown circuit 254. At the same time, respective associated countdown registers 274a, 274b,, and 274c of countdown circuit 254 are set to selected values.

Payload crypto device 250 is operative for decrypting product packets only if the PID of the respective packet is stored in one of the ten PID registers 272a–272j of countdown circuit 254 (the packet PID's are supplied to countdown circuit 254 by PID filter 253) and the contents of the corresponding countdown register does not equal zero. Therefore, payload crypto device 250 begins decrypting payloads of product packets having PID's 317, 318 and 319 and couples the decrypted packet payloads (together with all unencrypted packets) to transport demultiplexer 18 for further processing. Moreover, each time a product packet having a PID stored in a PID register 272a–272c is received by countdown circuit 254, the associated PID countdown register 274a–274c of countdown circuit 254 is decremented by a factor of unity. If any one of the countdown registers reaches a value of zero, countdown circuits 254 inhibits payload crypto device from decrypting any further packets having the corresponding PID. For example, if countdown register 274a, which is associated with PID register 272a storing PID 317, reaches a zero count, countdown circuit 254 will inhibit payload crypto device 250 from encrypting any further product packets having PID 317.

However, under normal operating conditions CA PID authorizations packets are transmitted and received at a rate sufficient to prevent anyone of the countdown registers 274a–274c from reaching a zero count. In particular, after verification by CPU 256 that the authorization level of a received CA PID authorization packet matches a subscriber authorization level in RAM 260 and that its PID matches a PID stored in one of the PID registers 272a–272j, the associated countdown register 274a–274j is set to the countdown register level value of the received CA PID authorization packet. The countdown register level preferably comprises one byte allowing the countdown register to be set to any one of 256 different values. It will thus be seen that by operating the network such that appropriate CA PID authorization packets (i.e. having selected PID/authorization level pairs) are transmitted and received before a given countdown register reaches a zero value, payload crypto device 250 will remain operative for decrypting product packets having the corresponding PID's. Authorization level matches may be established by searching the authorization list and bit map of RAM 260 in response to each received CA PID authorization packet. Alternatively, the authorization list and bit map may be searched only once in response to the viewer's program request. The corresponding authorization level, assuming that a match exists, is then stored in a reserved portion of RAM 260 associated with the PID's stored in PID registers 272a–272j and is checked for a match with each received CA PID authorization packet. The latter approach is, of course, less CPU intensive since a search of RAM 260 is not effected in response to each received CA PID authorization packet.

As a further option, the operation of DCAM 17 can be enhanced such that countdown registers 274a–274j are each also decremented in response to the receipt of any CA packet (PID=1). This will in effect clear (i.e. set to zero) all countdown registers 274a–274j having corresponding PID registers 272a–272j storing inactive PID's.

Referring back to FIG. 4, the communication status bits stored in status register 270 (derived from a received CA initialization packet) represent central facility acknowledgments of upstream packets transmitted by terminal 10. In particular, one communication status bit is provided for each ACK tag used by upstream transmitter 50 to signal acknowledgment of a message transmitted using the respective ACK tag. In the case of the preferred embodiment which uses odd and even ACK tags for upstream transmission packets, two communication bits are provided—one for each ACK tag. Acknowledgment of an upstream packet is provided by setting the respective communication status bit to "1" in the downstream CA initialization packet and then storing the received bit in status register 270. CPU 256 subsequently generates an interrupt to microprocessor 40 and transfers all stored communication status bits in one contiguous group from status register 270 to the microprocessor, after which the register is cleared. The transferred status communication bits thereby provide an indication to microprocessor 40 that the respective previously transmitted packet(s) have been successfully received at the central facility. Absent such indication, microprocessor 40 will initiate retransmission of the packet (using either an odd or even ACK tag) in accordance with a suitable backoff algorithm until an acknowledgment is received from the central facility in the form of an appropriately set communication bit as previously described.

In addition to the foregoing, one of the communication bits of the downstream CA packet is preferably designated as an Interrogate Command (IC) bit. The IC bit is transferred in parallel with the other communication bits (representing upstream packet acknowledgments) from status register 270 of DCAM 17 to processor 40. In response to the IC bit, processor 40 applies a predetermined message to upstream transmitter 50 for transmission back to the central facility. The predetermined message includes the S/N of the terminal and may also reflect various operating parameters, e.g. power level, of the upstream transmitter and is therefore useful in diagnosing problems effecting upstream transmissions.

As mentioned previously, upstream packets are transmitted in respective time slots which may be assigned for use in a reserved mode wherein a given time slot is reserved only for usage by a particular terminal or in a contention mode wherein all terminals may attempt to use the time slot to gain access to the network, all under supervision of the central facility. In particular, referring to FIG. 7, upstream packets from subscriber terminal 10 are received over cable 11 by a receiver 300 and supplied to a network controller 302. Controller 302 generates data and CA packets for downstream transmission, the CA packets being intercepted by DCAM 17 as previously described and the data packets being supplied to microprocessor 40 by transport demux 18. The output of network controller 302 is combined with video and audio data in an inserter/modulator 304 and transmitted in the downstream direction in the format previously described.

Network controller 302 provides various data for downstream transmission including the superframe signal and data defining the modalities of the upstream transmission time slots. The table of FIG. 7 illustrates a simplified strategy which may be used by network controller 302 in defining network time slot modality. Four parameters are considered in the table; upstream transmission power, the nature of the slot (i.e. reserved or contention), the number of ACK tags to be employed and the nature of the back-off algorithm used for contention slots. In a preferred embodiment of the invention, the transmission medium comprises a hybrid-fiber-coaxial (HFC) transmission network so that instantaneous transmission power must be limited to prevent laser clipping.

Referring in more detail to FIG. 8, assuming a relatively small population of subscriber terminals, i.e. less than Po, and relatively low upstream traffic, i.e. less than To, the most effective upstream transmission scenario is represented by block 400, in which each system subscriber is assigned one or more unique reserved time slots for upstream transmission at a maximum allowable energy level. Also, a maximum number N of ACK tags are assigned for use in transmitting upstream packets. Network controller 302 may establish this scenario by providing data for downstream transmission including slot width and superframe signals for establishing an adequate number of upstream transmission time slots (at least one per subscriber terminal) together with data assigning at least one unique time slot for usage by each respective terminal. The same scenario may be used with increased upstream traffic as represented by blocks 402 and 404 since each terminal has its own reserved upstream transmission time slots. In this regard, network controller 302 may determine the extent of upstream traffic as a function of the number of successfully received upstream messages over a given period of time.

As the population of subscriber terminals increases, for example greater than Po but less then P1, it becomes impractical to assign a unique time slot to each terminal. Thus, if upstream traffic is relatively low, as represented by block 406, 75% of the time slots may be assigned for use on a reserved basis while the remaining 25% are designated for contention use. This time slot mix may be achieved, for example, by assigning each terminal the same number of reserved and contention time slots or by skewing the number of reserved slots in favor of terminals having a history of extensive interactive use of the upstream channel. Also, in connection with the contention time slots, data is provided by network controller 302 for downloading a minimum retransmission backoff algorithm and limiting transmission power to 75% of maximum allowable energy. As the upstream traffic increases as represented by block 408 (more than To but less than T1) the time slot mix is changed to 50% reserved and 50% contention. Also, the transmission back-off algorithm for the contention slots is increased to a selected medium value and the transmission power is reduced to 50% of maximum allowable energy. With further increases in upstream traffic as represented by block 410 (more than T1 but less than T2), the transmission mix is further adjusted to provide 25% reserved and 75% contention time slots, with the latter using an increased retransmission back-off algorithm value and 25% maximum allowable energy.

Further increases in subscriber terminal population as represented by blocks 412–416 (more than P1) makes the use of any reserved slots impractical so that all upstream transmission time slots are used in a contention mode. As illustrated in the table, the retransmission back-off increases and the transmission power decreases with increasing upstream traffic.

It will be appreciated that the table of FIG. 7 represents a highly simplified model of the manner in which upstream transmission modes may be varied as a function of terminal population and upstream traffic and that many much more sophisticated models are possible. In addition, various other factors may be considered in defining the model such as the type of service requested. For example, it would be much more advantageous to assign a reserved slot to a terminal for use in playing an interactive game than for ordering a pay-per-view movie.

Figure 9:
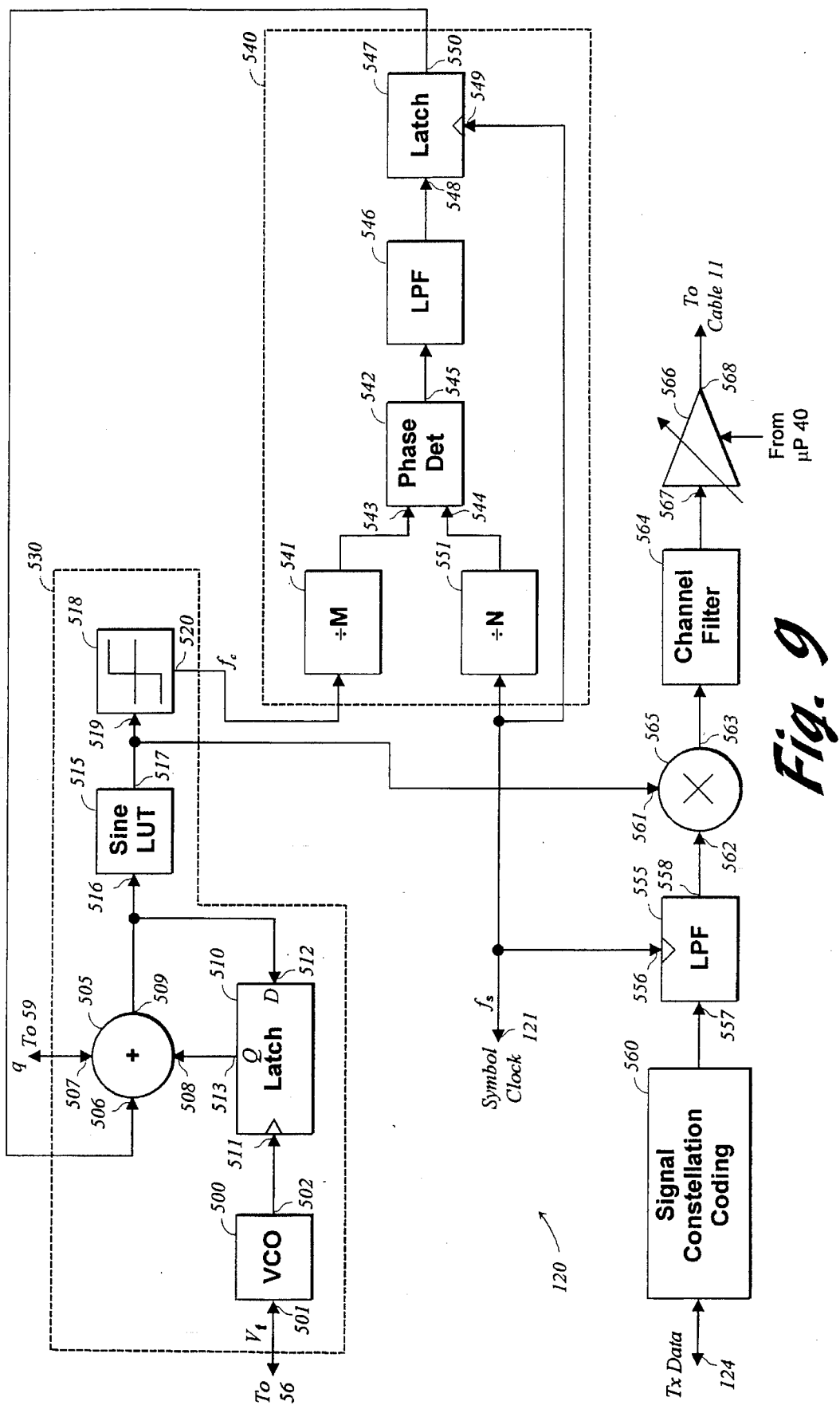
FIG. 9 is a block diagram of the modulator of FIG. 2.

FIG. 9 sets forth a block diagram of transmission modulator 120 of FIG. 2 in greater detail. As is seen in FIG. 2, transmission modulator 120 operates to modulate a selected carrier with the upstream data for transmission during a selected time slot to the cable system headend via the system network. The timing of upstream data transmission is controlled by the upstream transmitter shown in FIG. 2 in accordance with the above-described time slot allotment leaving the function of transmission carrier modulation to transmission modulator 120. Thus, transmission modulator 120 utilizes a discrete time oscillator 530 together with a phase lock loop 540 to provide a carrier signal at a selected frequency which is locked to a network reference such as the network symbol clock signal. A modulator 565 receives the generated carrier signal together with the to-be-transmitted data and produces the modulated carrier used for upstream communication.

More specifically, transmission modulator 120 includes discrete time oscillator 530 having a voltage controlled oscillator 500 having a tuning voltage input 501 coupled to output 56 of microprocessor 40 (seen in FIG. 2). Discrete time oscillator 530 further includes a latch circuit 510 having a clock input 511 coupled to output 502 of oscillator 500, a Q output 513 and a D input 512. A summer 505 includes an input 506, an input 507 coupled to output 59 of microprocessor 40, seen in FIG. 2, an input 508 coupled to the Q output 513 of latch 510, and an output 509. Output 509 of summer 505 is coupled to an input 516 of a sine wave lookup table 515. In addition, output 509 is further coupled to the D input 512 of latch 510. Sine lookup table 515 includes an output 517 coupled to an input 519 of a comparator type slicing circuit 518.

Transmission modulator 120 further includes a phase lock loop 540 having a phase detector 542 having inputs 543 and 544 and an output 545. A frequency dividing circuit 541 is coupled between output 520 of slicer 518 and input 543 of phase detector 542. A second frequency dividing network 551 is coupled to input 544 of phase detector 542. Output 545 of phase detector 542 is coupled to an input 548 of a latch circuit 547 via a low pass filter 546. Latch 547 includes a clock input 549 coupled to the input of frequency dividing network 551 and an output 550 coupled to input 506 of summer 505. Transmission modulator 120 includes a clock signal input 121 coupled to the input of frequency divider network 551 and which comprises the symbol clock from input 52 seen in FIG. 2.

As mentioned above, transmission modulator 120 includes an input 124 which receives the serial bit stream of data for upstream transmission. Transmission modulator 120 further includes a signal constellation coding circuit 560 which may for example comprise a conventional byphase shift key coding circuit which appropriately codes the serial bit data steam of upstream transmission data and applies it to an input 557 of a low pass filter 555. Filter 555 includes a clock signal input 556 coupled to symbol clock input 121. Output 558 of low pass filter 555 is coupled to input 562 of modulator 565. Modulator 565 includes an input 561 coupled to output 517 of sine wave lookup table 515 and an output 563. A channel filter 564 couples output 563 to an input 567 of a variable attenuator 566. Attenuator 566, which is controlled by a signal from microprocessor 40 to establish the upstream transmission energy, includes an output 568 coupled to cable 11 (seen in FIG. 1).

In operation, microprocessor 40 (seen in FIG. 2) produces initial values of the tuning voltage and value "q" for application to input 501 of oscillator 500 and to input 507 of summing network 505. These initial values of tuning voltage and input signal "q" to summing network 505 are programmable values selected to generate an output carrier having one of a plurality of frequencies within the upstream communication bandwidth of the system. Typically, such upstream communications are modulated upon carriers having frequencies within a range of 5–30 Megahertz. Oscillator 500 is a voltage controlled oscillator producing an output signal having a frequency determined by the tuning voltage input. Thus, the output signal of oscillator 500 is applied to the clock input of latch 510 having a Q output applied to one input of summing network 505. With the value q input to summing network 505 established by microprocessor 40 (seen in FIG. 2), an output combined signal is applied to sine wave lookup table 515. For purposes of speed and efficiency, only a predetermined number of the most significant bits within the output data of summer 505 are required for input to sine wave lookup table 515. Sine wave lookup table 515 responds to the input data at input 516 to produce a stream of digital values which are converted by slicer 518 to an output square wave or clock signal at the frequency of the sine wave produced by the values of lookup table 515. The output square wave signal from slicer 518 is applied to a divide by M frequency divider 541 which forms one input to phase detector 542.

Concurrently, the input symbol clock signal received at input 121 is frequency divided within divider 551 using a divide by N frequency division and applied to the remaining input of phase detector 542. The combination of frequency dividers 541 and 551 together with phase detector 542 is used to provide a carrier frequency for upstream communication which is locked to a network reference signal which is common to all subscriber terminals. Thus, as each transmission modulator within the cable television system uses carrier frequencies for upstream data communication which are all locked to a common network reference, the available bandwidth of upstream frequencies will be used with maximum efficiency. In the example shown in FIG. 8, the common network reference selected is that of the symbol clock signal. Thus, it is anticipated that other transmission modulators similar to transmission modulator 120 within the host cable television system will utilize different upstream carrier frequencies each locked to the common network reference provided by the symbol clock signal.

Accordingly, the values of M and N selected for frequency dividers 541 and 551 are selected to satisfy the expression fc=fs$2^M/2^N$ in which fc is the frequency of the upstream transmission carrier and fs is the frequency of the symbol clock reference signal. Phase detector 542 provides a frequency and phase comparison of the frequency divided input signals at inputs 543 and 544 and produces an output error signal representing the phase and frequency difference between the divided carrier signal and the divided symbol clock signal. This error signal is filtered by low pass filter 546 and applied to data input 548 of latch 547. Latch 547 is clocked by the symbol clock signal. The output signal of latch 547 representing the phase and frequency error signal is applied to input 506 of summing network 505. The application of the output error signal of latch 547 to input 506 of summing network 505 closes the control loop for discrete time oscillator 530 and phase lock loop 540 which operates to frequency and phase lock the carrier signal produced by discrete time oscillator 530 to the symbol clock signal.

Thus, in the event the frequency of carrier signal is less than its desired value, a positive error signal will be developed at the output of latch 547. In response, the output of summer 505 will increase at a more rapid rate thereby increasing the carrier frequency output signal of lookup table 515. Conversely, in the event the frequency of the carrier signal produced by discrete time oscillator 530 is greater than its desired value, a negative error signal will be produced at the output of latch 550 which in turn will decrease the rate of signal increase at the output of summer 505 thereby decreasing the frequency of carrier signal at the output of lookup table 515. When the carrier signal and symbol clock signal are properly phase and frequency locked, the value of error signal at the output of latch 550 will be zero.

The carrier frequency signal produced by discrete time oscillator 530 is applied to one input of modulator 565. The transmission data is properly coded by coding circuit 560 and filtered by filter 555 for application to the remaining input of modulator 565. The output of modulator 565 comprises a carrier having the carrier frequency produced by discrete time oscillator 530 modulated with the properly coded transmission data. Channel filter 564 filters the undesired modulation components from the modulated carrier signal and applies the desired modulated carrier to cable 11 (seen in FIG. 1) through programmable attenuator 566 for upstream communication.

It should be noted that the frequency of the carrier signal is controlled by programmable values of tuning voltage as well as frequency divider values M and N. Thus, the carrier frequency of transmission modulator 120 is readily established or changed using the programmable values providing substantial flexibility for the present invention upstream data transmission system.

While particular embodiments of the invention have been shown and described, it will be obvious to those skilled in the art that changes and modifications may be made without departing from the invention in its broader aspects. For example, the disclosed upstream transmission system can also be used in a network where the downstream signals are of an analog nature, or a hybrid network where some of the downstream signals are analog and some are digital. Therefore, the aim in the appended claims is to cover all such changes and modifications as fall within the true spirit and scope of the invention.

That which is claimed is:

1. In a two-way communications network, a method of acknowledging an upstream data message transmitted from a subscriber terminal to a central facility comprising the steps of:

multiplexing a plurality of product and conditional access data packets to form a transport bitstream, said conditional access packets comprising a plurality of conditional access data bits and one or more upstream data message acknowledgment status bits;

transmitting said transport bitstream in a downstream direction from said central facility to said terminal; and controlling a conditional access module and an upstream data transmission module in said terminal in response to said conditional access data bits and said upstream data message acknowledgment status bits respectively of said transmitted conditional access packets.

2. The method of claim 1 including applying said transmitted transport bit stream to said conditional access module, controlling said conditional access module in response to the conditional access data bits of the conditional access packets applied thereto, coupling said upstream data message acknowledgment status bits of said applied conditional access packets to said upstream data transmitter and controlling said upstream data transmitter in response to the acknowledgment status bits coupled thereto.

3. The method of claim 2 wherein said conditional access packets have a unique packet identification code and including intercepting said conditional access packets in said conditional access module in response to said unique packet identification code.

4. The method of claim 3 including controlling said conditional access module for authorizing a subscriber requested service and controlling said upstream transmission module in response to respective conditional access data bits and acknowledgment status data bits contained in the same conditional access packet.

5. In a two-way communications network, a method of sending an upstream data message from a subscriber terminal to a central facility comprising the steps of:

defining a plurality of acknowledgment tags each having a different assigned value;

composing said data message including an acknowledgment tag having a value selected from said plurality of assigned values, transmitting said data message in an upstream direction from said terminal to said central facility;

multiplexing a plurality of product and conditional access data packets to form a transport bitstream, said conditional access packets comprising a plurality of conditional access data bits and one or more acknowledgment status bits representing the successful receipt at said central facility of said data message including the acknowledgment tag having said selected value; and transmitting said transport bitstream in a downstream direction from said central facility to said terminal and controlling a conditional access module and an upstream data transmission module in said terminal in response to said conditional access data bits and said acknowledgment status bits respectively of said transmitted conditional access packets.

6. The method of claim 5 wherein said defining step comprises defining two acknowledgment tags each having a different value.

7. The method of claim 5 including transmitting a downstream message from said central facility to said terminal for controlling the number of said plurality of acknowledgment tags which can be used in said composing step.

8. The method of claim 5 including applying said transmitted transport bit stream to said conditional access module, controlling said conditional access module in response to the conditional access data bits of the conditional access packets applied thereto, coupling said acknowledgment status bits of said applied conditional access packets to said upstream data transmitter and controlling said upstream data transmitter in response to the acknowledgment status bits coupled thereto.

9. The method of claim 8 wherein said conditional access packets have a unique packet identification code and including intercepting said conditional access packets in said conditional access module in response to said unique packet identification code.

10. The method of claim 9 including storing said acknowledgment status bits in a register in said conditional access module and transferring said stored bits as a group to said upstream data transmitter.

11. The method of claim 10 including controlling said conditional access module for authorizing a subscriber requested service and controlling said upstream transmission module in response to respective conditional access data bits and at least one acknowledgment status bit contained in the same conditional access packet.

12. The method of claim 10 wherein at least one of said acknowledgment status bits comprises an interrogate command bit, and including transmitting a predetermined upstream data message in response to said interrogate command bit.

13. A subscription decoder comprising:

means for composing an upstream data message;

means for transmitting said upstream data message to a central facility;

a conditional access module; and means for receiving a stream of multiplexed downstream conditional access and product packets, said conditional access packets including a plurality of conditional access bits for controlling access of said conditional access module to said received product packets and at least one communication status bit representing acknowledgment by said central facility of successful receipt of said upstream data message.

14. The decoder of claim 13 wherein said conditional access module comprises a register for storing said at least one communication status bit and means for transferring said stored bit from said register to said composing means.

15. The decoder of claim 13 wherein said composing means comprises means for appending an acknowledgment tag to said upstream data message, said tag having a value selected from a plurality of different acknowledgment tag values and said received conditional access packets comprising a plurality of said communication status bits each corresponding to a respective one of said acknowledgment tag values and each representing acknowledgment by said central facility of successful receipt of an upstream data message including an acknowledgment tag having said corresponding value.

16. The decoder of claim 13 wherein said conditional access packets comprise a plurality of said communication status bits and wherein said conditional access module comprises a status register for storing said plurality of communication status bits and means for transferring said stored bits as a group from said status register to said composing means.

17. The decoder of claim 16 wherein said plurality of communication status bits further include an interrogate command bit, said composing means composing an upstream data message denoting the identity of said decoder in response to transfer of said interrogate command bit from said status register to said composing means.

* * * * *